United States Patent
Suzuki

(10) Patent No.: US 11,595,187 B2
(45) Date of Patent: Feb. 28, 2023

(54) COMMUNICATION DEVICE AND COMMUNICATION METHOD USED IN DECENTRALIZED NETWORK

(71) Applicant: FUJITSU LIMITED, Kawasaki (JP)

(72) Inventor: Dai Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 571 days.

(21) Appl. No.: 16/654,385

(22) Filed: Oct. 16, 2019

(65) Prior Publication Data
US 2020/0162240 A1    May 21, 2020

(30) Foreign Application Priority Data

Nov. 15, 2018   (JP) .............................. JP2018-215054

(51) Int. Cl.
| | | |
|---|---|---|
| *G06F 3/06* | (2006.01) | |
| *H04L 9/06* | (2006.01) | |
| *H04L 9/00* | (2022.01) | |

(52) U.S. Cl.
CPC ............ *H04L 9/0637* (2013.01); *G06F 3/062* (2013.01); *G06F 3/067* (2013.01); *G06F 3/0638* (2013.01); *H04L 9/50* (2022.05)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | | |
|---|---|---|---|---|
| 7,444,414 B2 * | 10/2008 | Foster | ..................... | H04L 63/10 |
| | | | | 709/227 |
| 7,685,206 B1 * | 3/2010 | Mathew | ................ | H04L 63/105 |
| | | | | 707/785 |

(Continued)

FOREIGN PATENT DOCUMENTS

| | | |
|---|---|---|
| CN | 107018125 | 8/2017 |
| CN | 107249046 | 10/2017 |

(Continued)

OTHER PUBLICATIONS

Blockchain, explained; Zach Church; MIT Management Sloan School; May 25, 2017; retrieved from https://mitsloan.mit.edu/ideas-made-to-matter/blockchain-explained on Apr. 5, 2022 (Year: 2017).*

(Continued)

*Primary Examiner* — Daniel C. Chappell
(74) *Attorney, Agent, or Firm* — Fujitsu Patent Center

(57) ABSTRACT

A communication device provides data to a data acquiring node based on a consensus of a plurality of participating nodes. The communication device includes a processor. The processor divides the data into N data components. N is an integer equal to or larger than two. When the N data components are stored in different storage areas, the processor encrypts addresses of storage areas in which the data components are respectively stored with respective public keys of N participating nodes among the plurality of participating nodes. The processor transmits access right information that indicates the data acquiring node has a right to access the data and the encrypted N addresses to the plurality of participating nodes.

9 Claims, 20 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | | |
|---|---|---|---|---|
| 7,822,989 | B2* | 10/2010 | Libin | G07C 9/20 713/157 |
| 8,176,320 | B1* | 5/2012 | Belanger | G06F 21/6218 713/168 |
| 8,566,911 | B2* | 10/2013 | Tu | H04L 63/105 455/411 |
| 10,133,609 | B2* | 11/2018 | Leggette | G06F 21/6218 |
| 2002/0178354 | A1* | 11/2002 | Ogg | G06Q 20/401 705/62 |
| 2003/0084020 | A1* | 5/2003 | Shu | H04W 12/033 |
| 2003/0204738 | A1* | 10/2003 | Morgan | H04L 63/0853 713/194 |
| 2007/0253548 | A1* | 11/2007 | Kameyama | G06F 21/6218 380/37 |
| 2010/0299313 | A1* | 11/2010 | Orsini | G06F 21/602 707/652 |
| 2014/0201541 | A1* | 7/2014 | Paul | G06F 21/6245 713/193 |
| 2015/0019878 | A1* | 1/2015 | Gammel | G06F 12/10 713/190 |
| 2015/0261973 | A1* | 9/2015 | O'Hare | H04L 63/0428 726/26 |
| 2016/0162897 | A1* | 6/2016 | Feeney | H04L 9/3236 705/71 |
| 2016/0254910 | A1* | 9/2016 | Finlow-Bates | H04L 9/0891 713/158 |
| 2017/0076518 | A1* | 3/2017 | Patterson | G06F 21/00 |
| 2017/0085555 | A1* | 3/2017 | Bisikalo | G06F 3/0619 |
| 2017/0317991 | A1* | 11/2017 | Lionetti | G06F 3/0647 |
| 2020/0082890 | A1* | 3/2020 | Karr | G06F 3/0688 |
| 2020/0153614 | A1* | 5/2020 | Srinivasan | H04L 9/0668 |
| 2020/0162240 | A1* | 5/2020 | Suzuki | G06F 3/0638 |
| 2020/0336298 | A1 | 10/2020 | Li | |
| 2022/0103533 | A1* | 3/2022 | Srinivasan | H04L 63/0435 |

FOREIGN PATENT DOCUMENTS

| | | |
|---|---|---|
| JP | 2006-311383 A | 11/2006 |
| JP | 2009-103774 | 5/2009 |
| JP | 2012-527838 A | 11/2012 |
| JP | 2015-079346 | 4/2015 |
| JP | 2017-79350 A | 4/2017 |
| WO | 2010/135412 A1 | 11/2010 |
| WO | 2018/109010 A1 | 6/2018 |
| WO | WO-2018109010 A1 * | 6/2018 ......... H04L 63/0435 |

OTHER PUBLICATIONS

B. Liu, L. Xiao, J. Long, M. Tang and O. Hosam, "Secure Digital Certificate-Based Data Access Control Scheme in Blockchain," in IEEE Access, vol. 8, pp. 91751-91760, 2020, doi: 10.1109/ACCESS.2020.2993921. (Year: 2020).*

EPOA—Office Action of corresponding European Patent Application No. 19203215.9 dated Aug. 26, 2021. ** WO2018/109010A1 cited in the EPOA was already submitted with IDS dated Apr. 27, 2020.

CNOA—Office Action of Chinese Patent Application No. 201911005489.0 dated Sep. 16, 2021, with English translation. ** Reference WO2018/109010 cited in CNOA was previously submitted in the IDS filed on Apr. 27, 2020.

EESR—Extended European Search Report of European Patent Application No. 19203215.9 dated Mar. 20, 2020.

Fukumitsu Masayuki et al: "A Proposal of a Secure P2P-Type Storage Scheme by Using the Secret Sharing and the Blockchain", 2014 IEEE 28th International Conference on Advanced Information Networking and Applications, IEEE, Mar. 27, 2017, pp. 803-810. [Cited in EESR filed herewith].

Storj Labs et al: "Storj : A Decentralized Cloud Storage Network Framework", Oct. 30, 2018, XP055636768. [Cited in EESR filed herewith].

JPOA—Japanese Office Action in Japanese Patent Application No. 2018-215054 dated May 31, 2022.

* cited by examiner

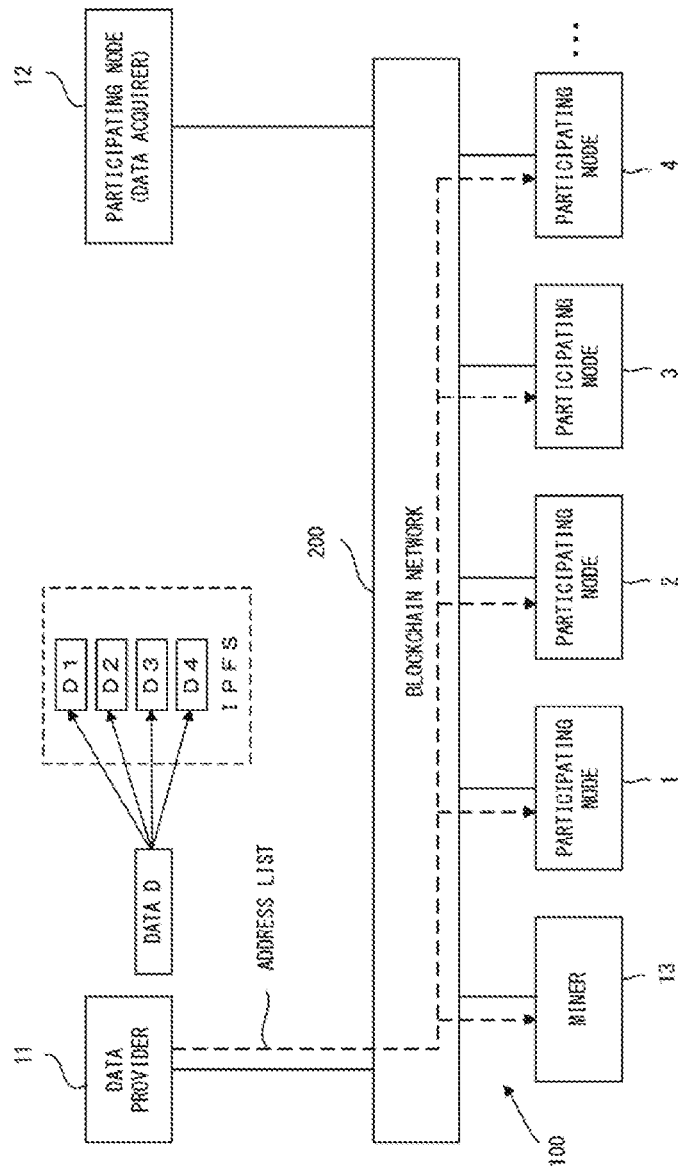
F I G. 4

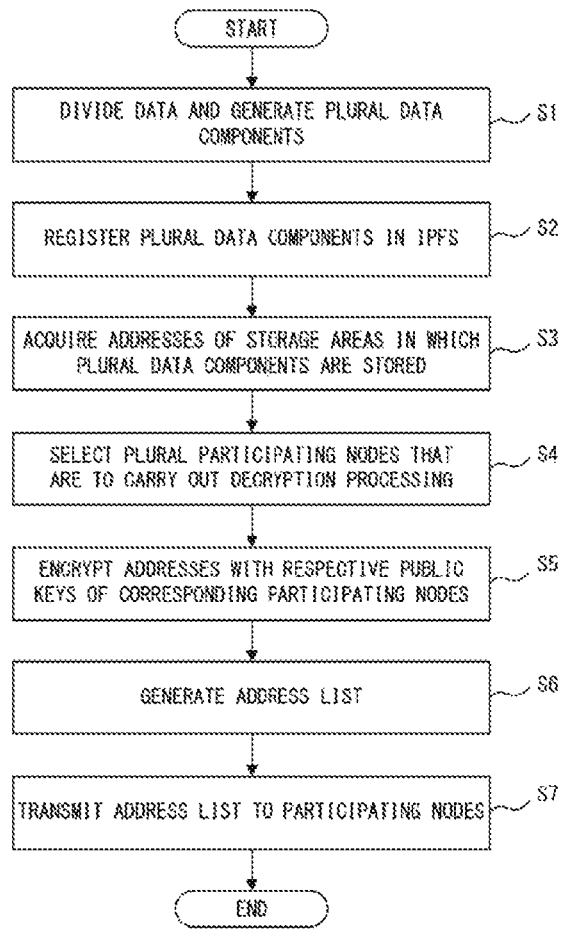
F I G. 14

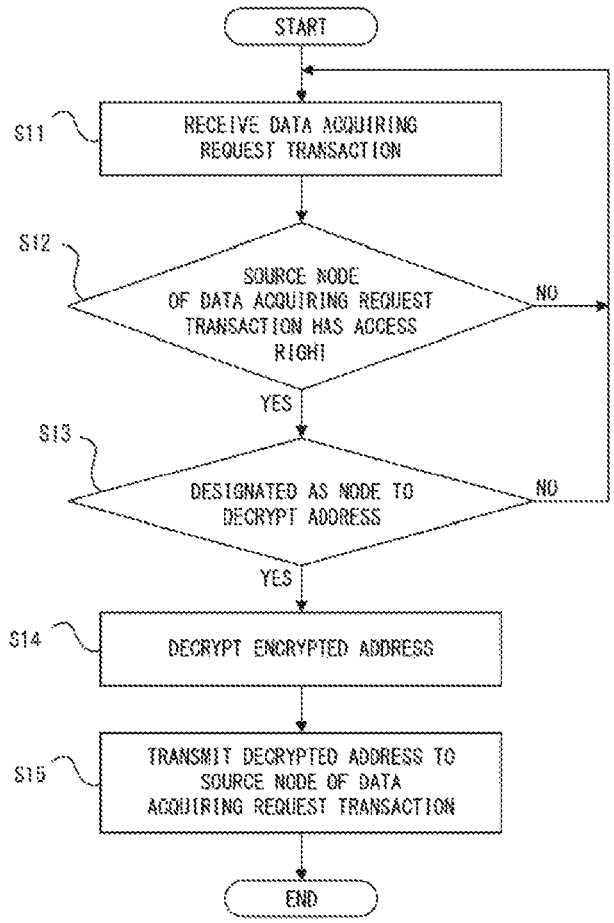
F I G. 15

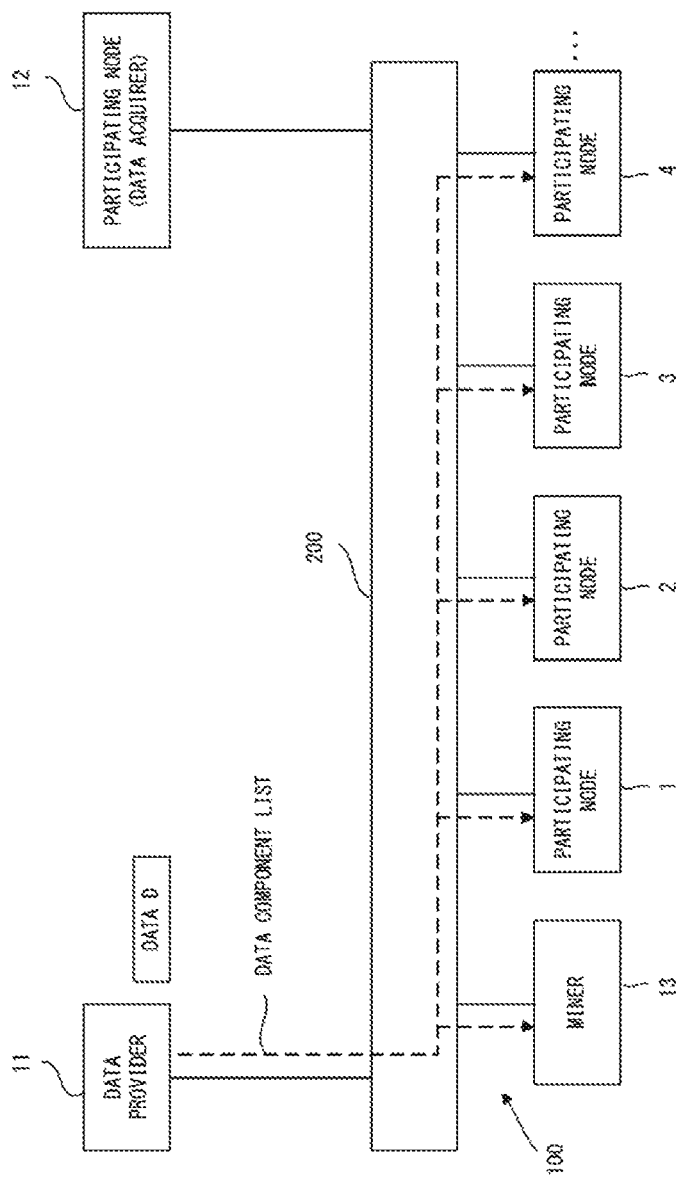
F I G. 1 9

COMMUNICATION DEVICE AND COMMUNICATION METHOD USED IN DECENTRALIZED NETWORK

CROSS-REFERENCE TO RELATED APPLICATIONS

This application is based upon and claims the benefit of priority of the prior Japanese Patent Application No. 2018-215054, filed on Nov. 15, 2018, the entire contents of which are incorporated herein by reference.

FIELD

The embodiments discussed herein are related to a communication device and a communication method that are used in a decentralized network.

BACKGROUND

Data trading markets for providing services to sell and purchase data have been spreading in recent years. Participants of such data trading markets can provide their own data on the market. The participants can also obtain or purchase data provided on the market.

On the other hands, the blockchain technology, which manages data in a tamper-proof state in a decentralized environment without any administrator, has been attracting attentions. The blockchain technology achieves a tamper-proof distributed ledger by plural participants or all participants verifying a transaction. Methods of using the blockchain have been proposed for supporting data trading markets.

In systems such as the blockchain in which plural distributed nodes cooperatively execute a process, consensus algorithms are used to synchronize processing results across all nodes. The consensus algorithms allow a process to be confirmed after plural participating nodes verify processing details and processing results.

In data trading systems, data registration and data acquisition are carried out. In data registration procedures, information related to data to be registered (e.g., metadata) is used. Such metadata includes access policy information that indicates to which user(s) the data can be disclosed. In data acquiring procedures, a data provider verifies access policies and transmits data when a user requesting the data is confirmed to have the right to access the data.

Note that methods of safely storing highly confidential data with small hardware resources have been proposed (e.g., Japanese Laid-open Patent Publication No. 2006-311383). In addition, methods of securely storing data in cloud computing resources have been proposed (e.g. Japanese National Publication of International Patent Application No. 2012-527838). Moreover, methods of improving anonymity in communications over a network have been proposed (e.g., Japanese Laid-Open Patent Publication No. 2017-079350).

In the blockchain, as described above, a transaction is verified by plural participants. A consensus of all participants is formed in accordance with plural verification results.

PoW (Proof of Work) has been widely used as one of consensus algorithms. PoW is suitable for a case of forming a consensus in a network consisting of an unspecified number of participants because of its strict approval processes. Therefore, when a transaction requested from an unspecified number of participants is processed in data trade services, consensus may be formed by PoW. However, when consensus is formed by PoW, it may take a long time until a requested transaction is executed.

SUMMARY

According to an aspect of the embodiments, a communication device provides data to a data acquiring node based on a consensus of a plurality of participating nodes. The communication device includes a processor. The processor is configured to divide the data into N data components, N being an integer equal to or larger than two; to encrypt, when the N data components are stored in different storage areas, addresses of storage areas in which the data components are respectively stored with respective public keys of N participating nodes among the plurality of participating nodes; and to transmit access right information that indicates the data acquiring node has a right to access the data and the encrypted N addresses to the plurality of participating nodes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of data registration procedures;

FIG. 14 is a flowchart of an example of data registration procedures;

FIG. 15 is a flowchart of an example of processing in a participating node in the data acquiring procedures;

FIG. 19 illustrates an example of data registration procedures according to the third embodiment.

DESCRIPTION OF EMBODIMENTS

Figure 1:
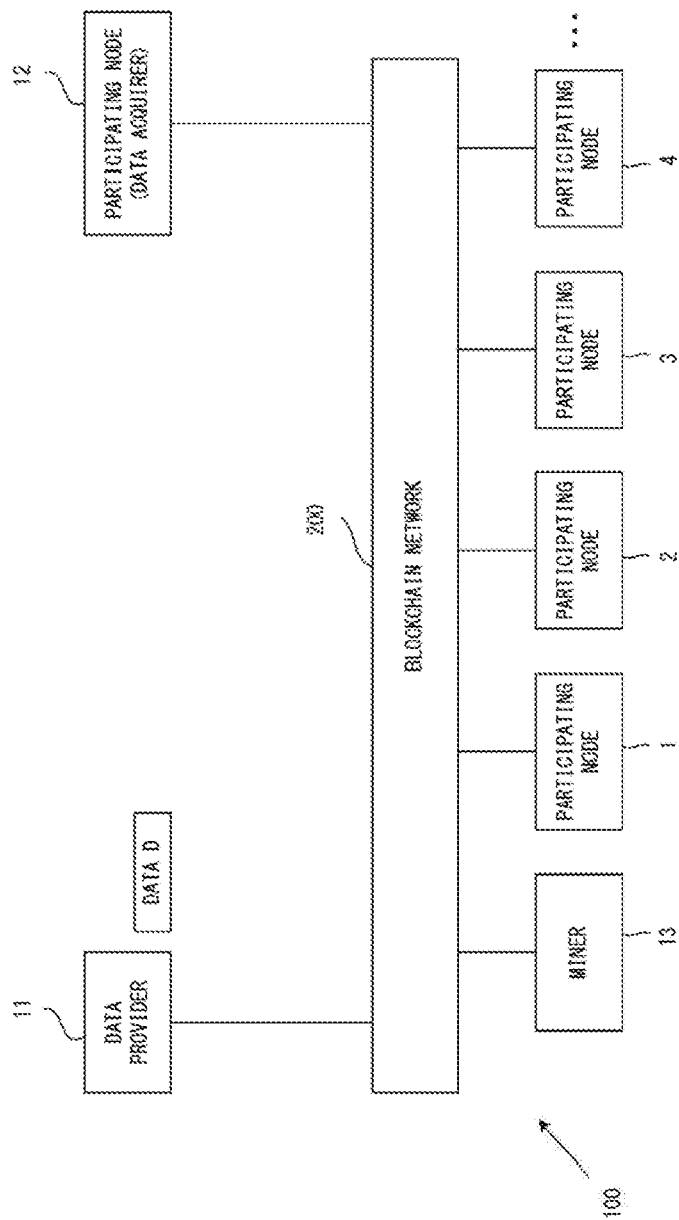
FIG. 1 illustrates an example of a communication system according to the present embodiments.

FIG. 1 illustrates an example of a communication system according to the present embodiments. In this example, a communication system 100 provides a data trade service by using the blockchain technology.

In the following description, a computer used by a user participating in a data trade service may be referred to as "participating node (or participant)". A user providing data to a data trade service or a computer used by such a user may be referred to as "data provider (or data provider node)". A user who obtains data by using a data trade service or a computer used by such a user may be referred to as "data acquirer (or data acquiring node)". A computer that verifies data processing transactions may be referred to as "miner". Note that the data provider, the data acquirer, and the miner are participating nodes that participate in a data trade service. In other words, each participating node can serve as a data provider node, a data acquiring node, or a miner.

As illustrated in FIG. 1, plural participating nodes (participating nodes 1 to 4 in FIG. 1), a data provider 11, a participating node (data acquirer) 12, and a miner 13 are connected in a blockchain network 200. Note that an unspecified number of participating nodes can be connected in the blockchain network 200. In addition, plural miners can be connected in the blockchain network 200.

Each of the participating nodes 1 to 4 has a function to perform cryptographic communications. In other words, each of the participating nodes 1 to 4 generates a pair of a public key and a secret key and makes the public key publicly available. Therefore, a data provider 11, for example, has a public key for each of the participating nodes 1 to 4.

The data provider 11 provides data D to a data trade service. In this example, the data provider 11 provides data D to participating nodes that are limited to those which are allowed by the data provider 11. In the example illustrated in FIG. 1, the data provider 11 allows the participating node (data acquirer) 12 to access data D.

When the participating node (data acquirer) 12 needs to obtain data D, the participating node (data acquirer) 12 generates a data acquiring request transaction to request data D. This data acquiring request transaction is transmitted to each of the participating nodes over the blockchain network 200.

The miner 13 verifies transactions generated by each of the participating nodes. For example, when a data acquiring request transaction is generated by the data acquirer 12, the miner 13 verifies the data acquiring request transaction. Here, the miner 13 verifies "block" including plural transactions.

Figure 2:
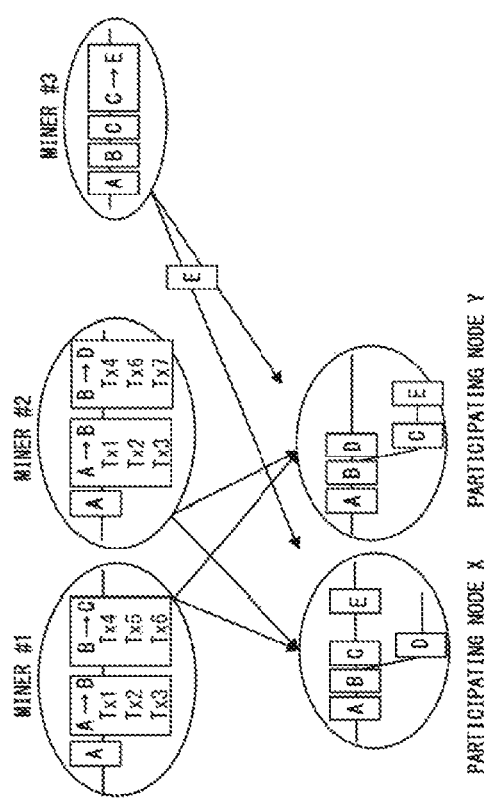
FIG. 2 is a diagram for explaining verification and confirmation of blocks.

FIG. 2 is a diagram for explaining verification and confirmation of blocks by means of PoW. In this example, each of miners #1 to #3 verifies blocks. The verification results are transmitted to all participating nodes connected to the blockchain network. Note that in the example illustrated in FIG. 2, verification of block A has been already finished.

Miner #1 verifies block B that includes transactions Tx1, Tx2, and Tx3 and further verifies block C that includes transactions Tx4, Tx5, and Tx6. These verification results are transmitted to all participating nodes. Miner #2 also verifies block B that includes transactions Tx1, Tx2, and Tx3 and further verifies block D that includes transactions Tx4, Tx5, and Tx7. These verification results are also transmitted to all participating nodes.

In each of the participating nodes, the verification results are connected in order of reception. In other word, a chain is formed. For example, in participating node X, blocks A, B, and C are connected in this order based on the verification results received from miner #1. Next, the verification results of miner #2 arrive at participating node X. In the verification results received from miner #2, block D follows block B. In this case, block D is connected after block B in participating node X. Subsequently, the verification results of miner #3 arrive at participating node X. In the verification results received from miner #3, block E follows block C. In this case, block E is connected after block C in participating node X.

When a specified number of blocks are connected after a block (hereinafter referred to as a target block), participating nodes make a confirmation of the target block. For example, in PoW, when six blocks are connected after a target block, the target block is determined to be confirmed. Then the participating nodes can execute transactions in the confirmed block. For example, when a data transmission request transaction is given to participating node X, after six blocks are connected after a block that includes the data transmission request transaction, participating node X can transmit data in accordance with the data transmission request transaction.

Figure 3:
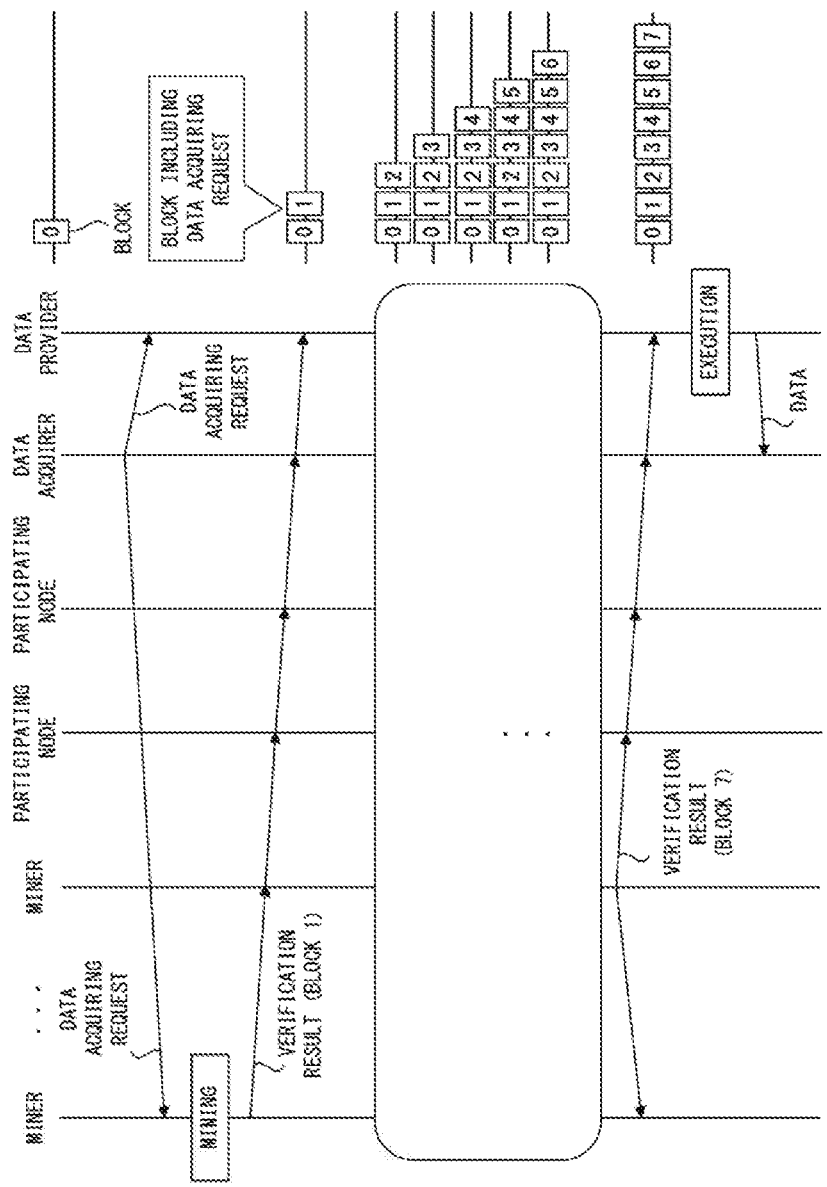
FIG. 3 illustrates an example of a sequence of data transmission when consensus is formed by PoW.

FIG. 3 illustrates an example of a sequence of data transmission when consensus is formed by PoW. In this example, a data acquirer generates a data acquiring request transaction and transmits the transaction to all nodes. Note that when the data acquirer generates a data acquiring request transaction, block 0 is recorded in the blockchain of the data provider.

A miner verifies block 1 that includes a data acquiring request transaction and transmits the verification result to all nodes. Consequently, block 1 is connected after block 0 in the blockchain of the data provider.

Afterwards, participating nodes on the network generate transactions one after another. Miners verify blocks including plural transactions and transmit the verification results to all nodes. As a result, blocks are added to a blockchain in each of the nodes. When six blocks (i.e., blocks 2 to 7) are connected after block 1 in the blockchain of the data provider, the data provider executes the data acquiring request transaction included in block 1. As a result, data is transmitted from the data provider to the data acquirer.

As described above, in the case where consensus is established by means of PoW, a node that received a transaction to be processed cannot execute the transaction until verification of a specified number of blocks finishes. Consequently, the latency time until execution of requested processing (e.g., data transmission in the case of FIG. 3) may be long.

First Embodiment

FIG. 4 illustrates an example of data registration procedures. In this example, a data provider 11 provides data D to a data trade service.

The data provider 11 divides data D into N data components (N is an integer equal to or larger than 2) by means of Shamir's secret sharing scheme. In the example illustrated in FIG. 4, data D is divided into four data components D1 to D4.

Note that the data provider 11 may encrypt data D before dividing data D. For example, data D may be encrypted with a public key of a participating node that is allowed to access data D. Or, data D may be encrypted with a common key. In this case, this common key is encrypted with a public key of a participating node that is allowed to access data D.

Figure 5:
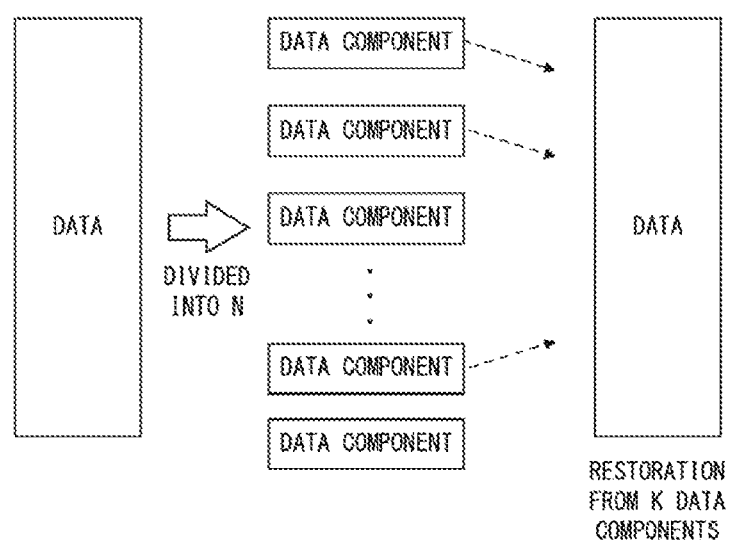
FIG. 5 is a diagram for explaining the Shamir's secret sharing scheme.

In Shamir's secret sharing scheme, input data is divided into N data components as illustrated in FIG. 5. At that time, each of the data components is generated in a manner that contents of the input data are kept secret. In addition, a decryption device can reproduce the input data from K data components (K is an integer of N or less) from among N data components. A value of N and a value of K can be set in advance. For example, the values of N and K may be the total number of participating nodes. The values of N and K may also be determined in accordance with the degree of importance. In this case, the values of N and K may be made larger when the data is important.

The data provider 11 may divide data D into N data components by means of a method other than the Shamir's secret sharing scheme. However, each of the data components is preferably generated in a manner that contents of the original data are kept secret. In addition, it is preferable that the original data can be reproduced from K data components from among N data components.

The data provider 11 stores data components D1 to D4 to a specified storage area. In this example, data components D1 to D4 are stored in different regions on IPFS (Inter Planetary File System). At that time, data components D1 to D4 are stored in IPFS in such a state that each of the participating nodes can access data components D1 to D4. However, addresses of the storage areas in which data components D1 to D4 are stored are not disclosed. Therefore, at this point in time, each of the participating nodes is practically unable to access data components D1 to D4.

The data provider 11 obtains the addresses of the storage areas in which data components D1 to D4 are stored. For example, when data components D1 to D4 are stored in IPFS, each of addresses of the storage areas in which each of data components D1 to D4 is stored is output. In this example, data components D1, D2, D3, and D4 are stored in addresses ADD1, ADD2, ADD3, and ADD4, respectively.

Note that in the example illustrated in FIG. 4, data components D1 to D4 are stored in IPFS, but the first embodiment is not limited to this configuration. In other words, the data provider 11 can store data components D1 to D4 in any storage areas.

The data provider 11 encrypts addresses ADD1 to ADD4 of the storage areas in which data components D1 to D4 are stored. At that time, the data provider 11 selects the same number of participating nodes as the number of data components stored in IPFS from among all participating nodes participating in the data trade service as participating nodes that execute decryption processing described later. In this example, the participating nodes 1 to 4 are selected for data components D1 to D4, respectively, as participating nodes that execute decryption processing described later. The data provider 11 encrypts addresses ADD1 to ADD4 of the storage areas in which data components D1 to D4 are stored with each public key of the participating nodes 1 to 4. In other words, address ADD1 is encrypted with a public key of the participating node 1, address ADD2 is encrypted with a public key of the participating node 2, address ADD3 is encrypted with a public key of the participating node 3, and address ADD4 is encrypted with a public key of the participating node 4. Consequently, encrypted addresses ADD1 to ADD4 are obtained.

Figure 6:
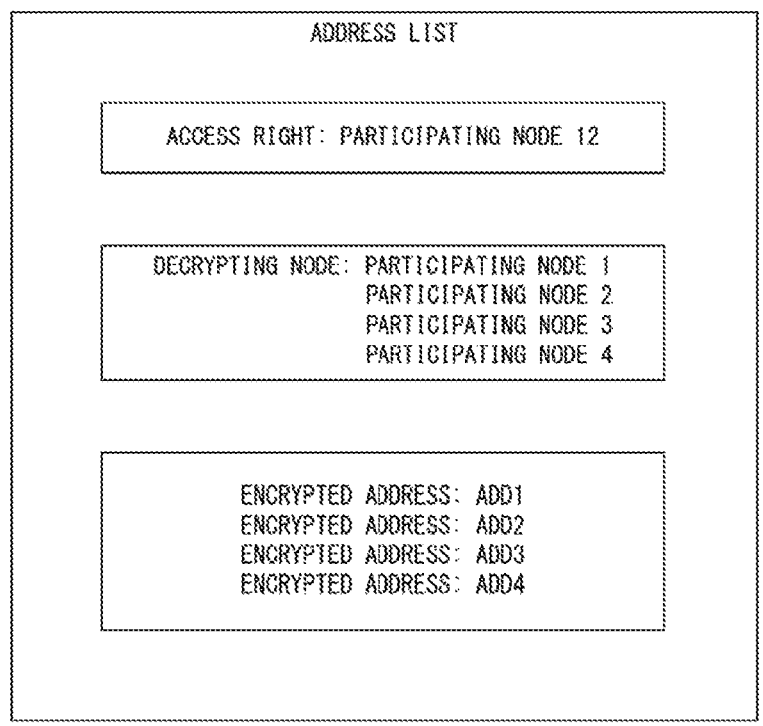
FIG. 6 illustrates an example of an address list.

The data provider 11 generates an address list relating to registration of data D. This address list includes access right information, a list of decrypting nodes, and encrypted addresses as illustrated in FIG. 6. The access right information indicates participating nodes that are allowed to access data D. In this example, the data provider 11 allows a participating node (data acquirer) 12 to access data D. The list of decrypting nodes indicates participating nodes that decrypt any one of encrypted addresses ADD1 to ADD4. In this example, encrypted addresses ADD1 to ADD4 are obtained by encrypting addresses ADD1 to ADD4 with public keys of the participating nodes 1 to 4, respectively. Thus, the participating nodes 1 to 4 are listed on the list of decrypting nodes. The encrypted addresses ADD1 to ADD4 generated in the above manner are listed on the address list as the encrypted addresses.

The address list is disclosed to all participating nodes. In other words, the data provider 11 transmits the address list to all participating nodes as illustrated in FIG. 4. The address list may be recorded, for example, on the blockchain as a result of execution of data registration contrast. Each of the participating nodes stores the address list received from the data provider 11. With this processing, the data registration procedures are completed.

Figure 7:
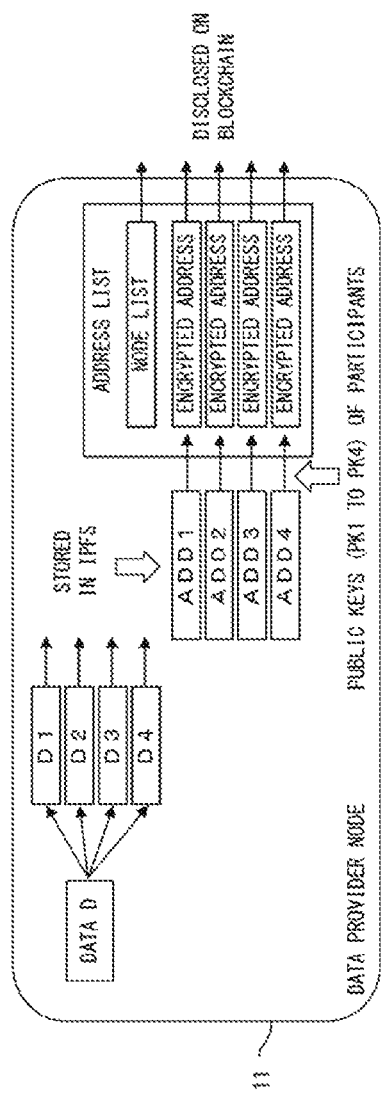
FIG. 7 illustrates an example of procedures to generate data components and encrypted addresses.

FIG. 7 illustrates an example of procedures to generate data components and encrypted addresses. In the data registration procedures, the data provider 11 divides data D into data components D1 to D4 by means of the Shamir's secret sharing scheme and registers the data components in IPFS. The data provider 11 also obtain addresses ADD1 to ADD4 for storage areas in which data components D1 to D4 are stored. Moreover, the data provider 11 generates encrypted addresses ADD1 to ADD4 by encrypting address ADD1 to ADD4 with public keys PK1 to PK4 of the participating nodes 1 to 4. An address list that includes the encrypted addresses ADD1 to ADD4 is disclosed on the blockchain.

FIG. 8 to FIG. 11 illustrate an example of data acquiring procedures. In this example, the participating node (data acquirer) 12 acquires data D. For that reason, the participating node (data acquirer) 12 may be simply referred to as "data acquirer 12" in the description of the data acquiring procedures. Note that the data registration procedures illustrated in FIG. 4 have been completed before the data acquiring procedures illustrated in FIG. 8 to FIG. 11 start. In other words, data components D1 to D4 obtained by dividing data D are stored in IPFS, and each of the participating nodes 1 to 4 has received an address list illustrated in FIG. 6 from the data provider 11.

Figure 8:
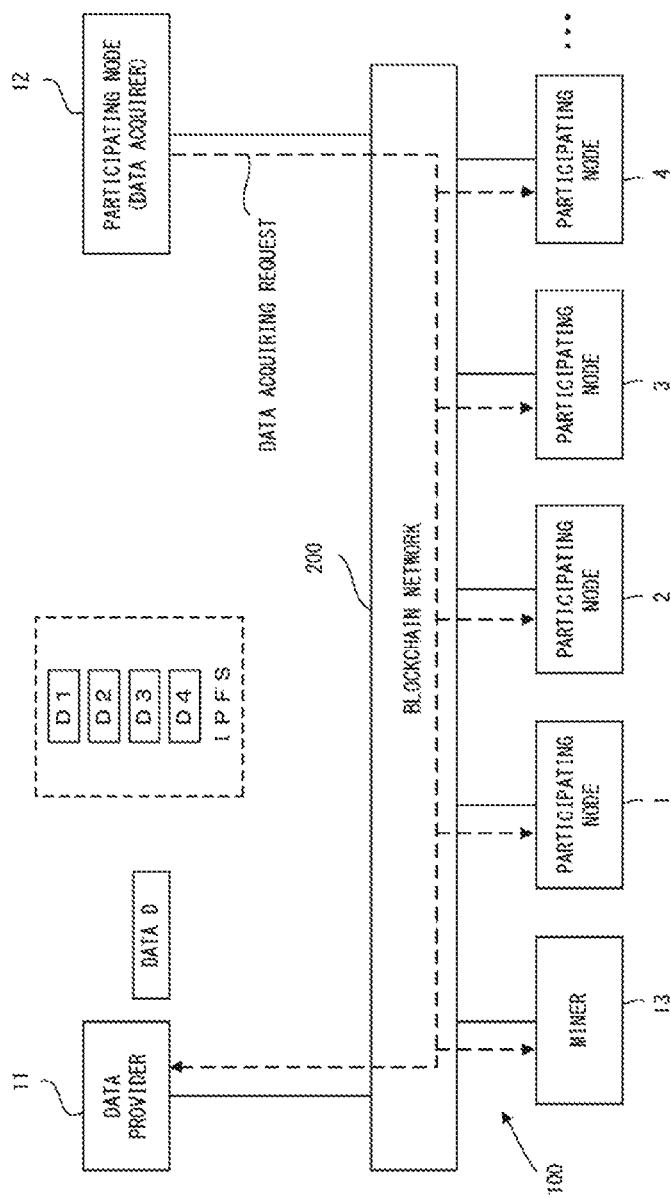
FIG. 8 to FIG. 11 illustrate an example of data acquiring procedures.

In FIG. 8, the data acquirer 12 generates a data acquiring request transaction. At that time, the data acquirer 12 may transmit the transaction to a data acquiring contrast. This data acquiring request transaction includes a message that requests acquisition of data D. The data acquiring request transaction is transmitted to all participating nodes. In other words, each of the participating nodes 1 to 4 receives the data acquiring request transaction transmitted from the data acquirer 12. Note that the data acquiring request transaction includes information that identifies the transmission source.

Figure 9:
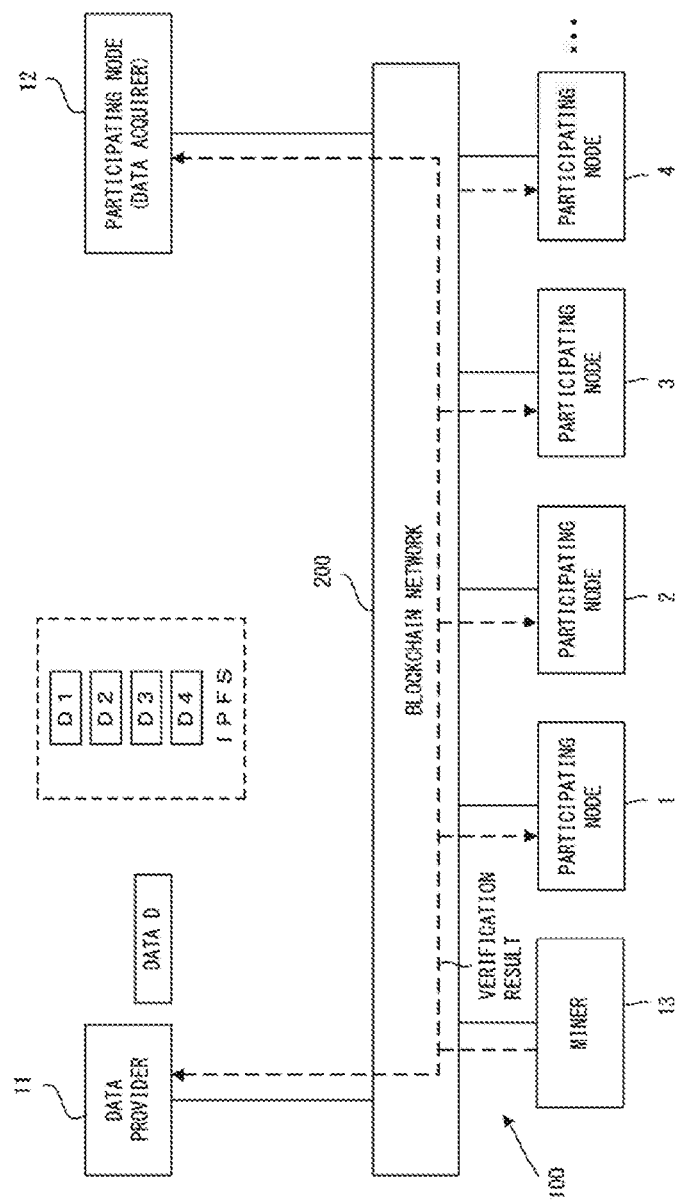

In FIG. 9, the miner 13 verifies a block that includes the data acquiring request transaction transmitted from the data acquirer 12. The miner 13 transmits the verification result of the block to all participating nodes. In other words, each of the participating nodes 1 to 4 receives the verification result from the miner 13.

Figure 10:
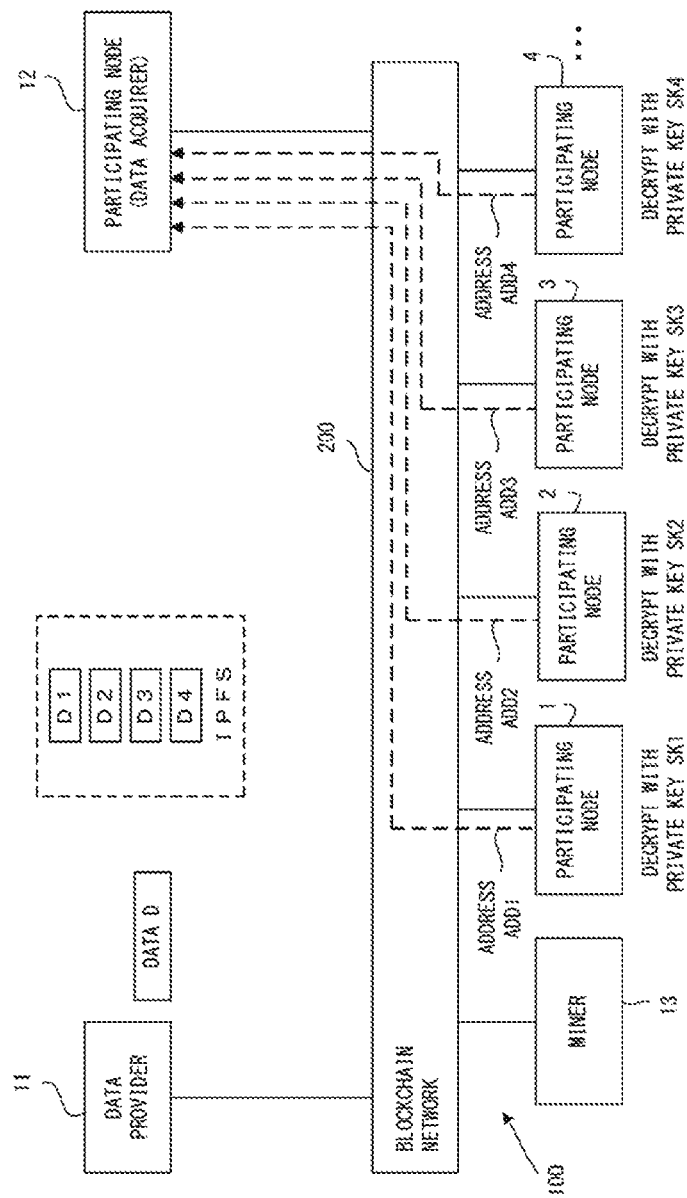

In FIG. 10, when the verification result of the block including the data acquiring request transaction is received from the miner 13, each of the participating nodes 1 to 4 confirms the right to access the data that the data acquiring request transaction transmitted from the data acquirer 12 requests. At that time, each of the participating nodes 1 to 4 refers to the address list received in advance from the data provider 11. In this example, the participating node (data acquirer) 12 is granted the access right to data D as illustrated in FIG. 6. Thus, each of the participating nodes 1 to 4 executes processing corresponding to the received data acquiring request transaction.

Each of the participating nodes 1 to 4, first, determines whether the participating node itself is a decrypting node that decrypts an encrypted address or not. More specifically, each of the participating nodes 1 to 4 determines whether or not the participating node itself is registered as a decrypting node in the address list received in advance from the data provider 11. In the example illustrated in FIG. 6, the participating nodes 1 to 4 are registered as decrypting nodes. Each of the participating nodes 1 to 4 thus executes decrypting processing.

The participating node 1 executes decryption processing on four encrypted addresses ADD1 to ADD4 by using a private key of the participating node 1. Here, encrypted addresses ADD1 to ADD4 are encrypted with public keys of each of the participating nodes 1 to 4. Thus, when the decryption processing is executed with a private key of the participating node 1, decryption of encrypted address ADD1 will be successful, but decryption of encrypted addresses ADD2 to ADD4 will fail. In other words, the participating node 1 can obtain address ADD1, but cannot obtain addresses ADD2 to ADD4.

In the similar manner, the participating node 2 execute decryption processing of encrypted addresses ADD1 to ADD4 by using a private key of the participating node 2 and obtains address ADD2. The participating node 3 execute decryption processing of encrypted addresses ADD1 to ADD4 by using a private key of the participating node 3 and obtains address ADD3. The participating node 4 execute decryption processing of encrypted addresses ADD1 to ADD4 by using a private key of the participating node 4 and obtains address ADD4. Subsequently, the participating nodes 1 to 4 respectively transmit address ADD1 to ADD4 to data acquirer 12.

Figure 11:
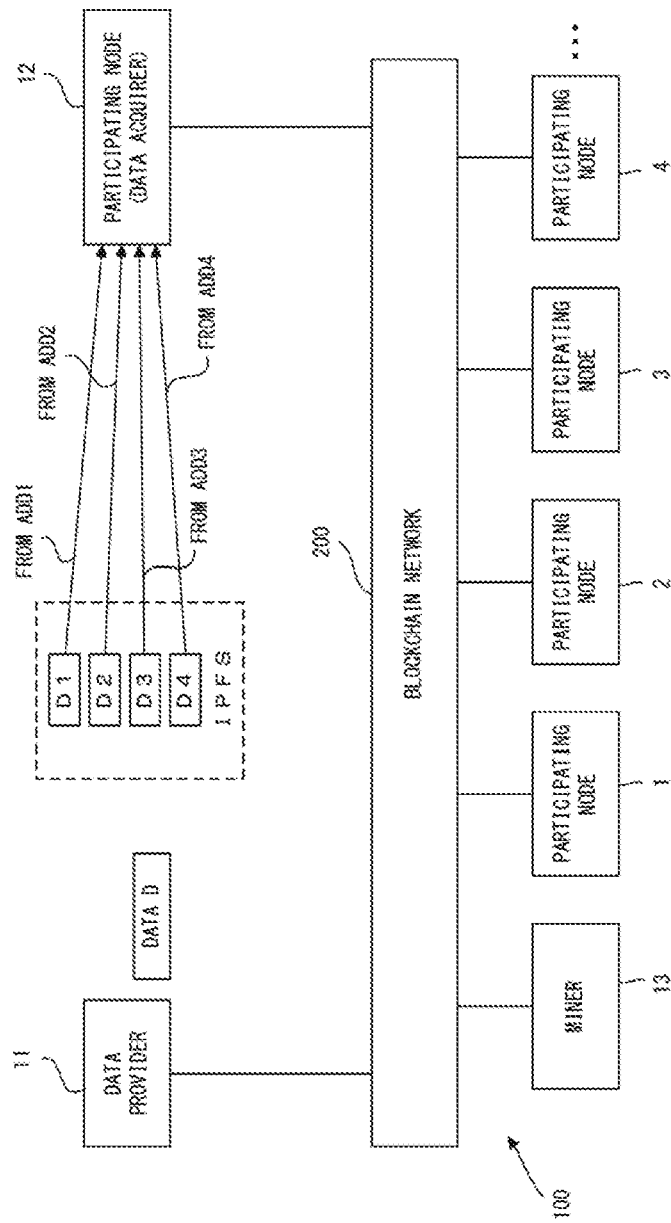

In FIG. 11, the data acquirer 12 accesses to the addresses received from the participating nodes 1 to 4 and obtains data components D1 to D4 from IPFS. More specifically, the data acquirer 12 obtains data component D1 from address ADD1, data component D2 from address ADD2, data component D3 from address ADD3 and data component D4 from address ADD4. Afterward the data acquirer 12 reproduces data D from the obtained data components D1 to D4.

Note that in the example illustrated in FIG. 11, the data acquirer 12 obtains all of data components D1 to D4, but the first embodiment is not limited to this case. When data D can be reproduced from any three of data components D1 to D4 as an example, the data acquirer 12 may reproduce data D by obtaining any three of data components D1 to D4. For example, when decryption performed by the participating node 4 fails, the data acquirer 12 receives addresses ADD1 to ADD3. In this case, the data acquirer 12 reproduces data D by obtaining data components D1 to D3 from IPFS.

Figure 12:
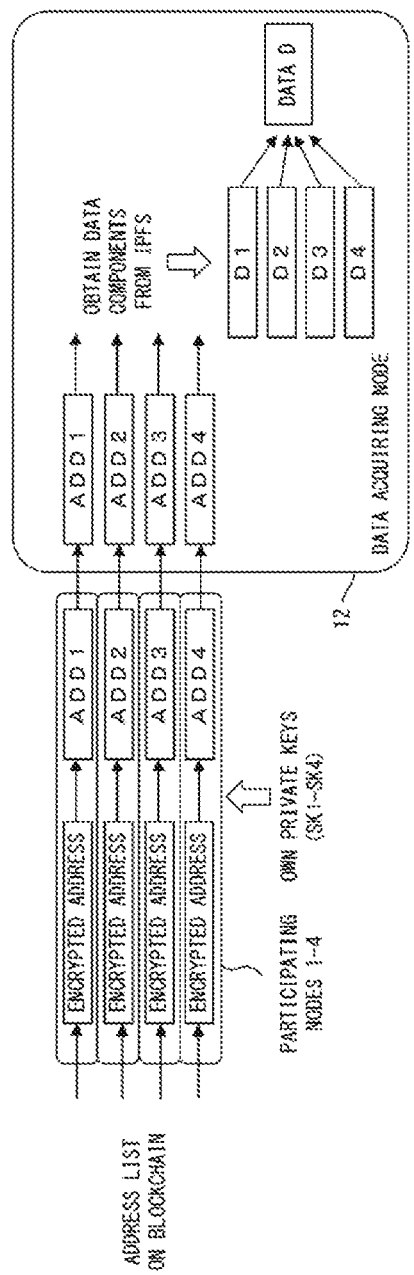
FIG. 12 illustrates an example of decryption of encrypted addresses and acquisition of data components.

FIG. 12 illustrates an example of decryption of encrypted addresses and acquisition of data components. In this example, the access right of the data acquirer 12 has been already confirmed by each of the participating nodes 1 to 4.

The participating nodes 1 to 4 obtains addresses ADD1 to ADD4, respectively, by decrypting encrypted addresses ADD1 to ADD4 on the address list with private keys SK1 to SK4 of the participating nodes 1 to 4. Addresses ADD1 to ADD4 are respectively transmitted to the data acquirer 12. The data acquirer 12 accesses to IPFS with addresses ADD1 to ADD4 and obtains data components D1 to D4. The data acquirer 12 reproduces data D from data components D1 to D4.

Figure 13:
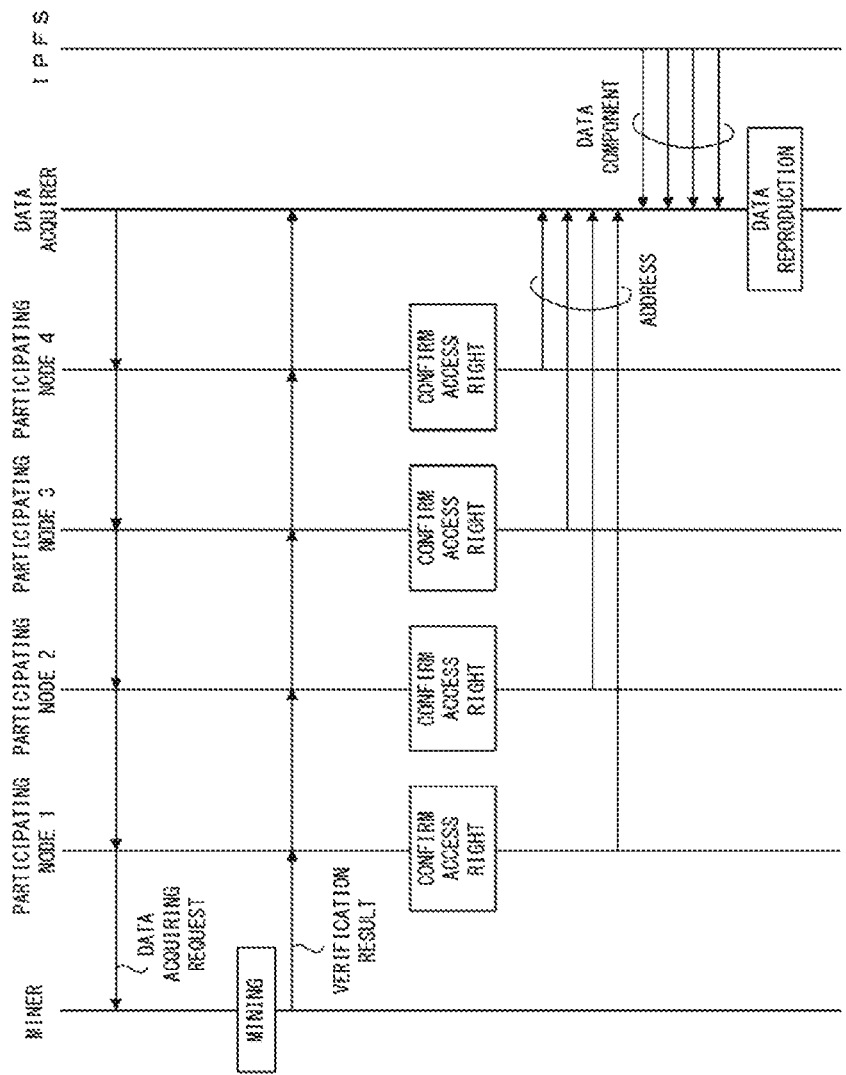
FIG. 13 illustrates an example of a sequence of data acquiring procedures.

FIG. 13 illustrates an example of a sequence of data acquiring procedures. In this example, the data registration procedures illustrated in FIG. 4 have been completed. In other words, data components D1 to D4 obtained by dividing data D are stored in IPFS, and each of the participating nodes 1 to 4 has received an address list illustrated in FIG. 6 from the data provider 11.

When the data acquirer 12 generates a data acquiring request transaction, the miner 13 executes mining on a block including the transaction. This mining verifies the data acquiring request transaction. A verification result is transmitted to each of the participating nodes.

The participating nodes 1 to 4, after confirming the access right of the data acquirer 12, each obtains an address by means of decryption processing using own private key and transmits the address to the data acquirer 12. The data acquirer 12 obtains data components D1 to D4 from the addresses received from the participating nodes 1 to 4 and reproduces data D from data components D1 to D4.

Here, the communication method illustrated in FIG. 3 is compared with the communication method according to the first embodiment. In the communication method illustrated in FIG. 3, a consensus is formed when a specified number of blocks (six blocks in the example) are connected after a block that includes a target transaction, and then the target transaction can be executed. In this case, it may take a long time to execute a target transaction from generation of the transaction.

On the other hand, in the communication method according to the first embodiment, plural participating nodes respectively decrypt encrypted addresses, and the data acquirer 12 obtains data when a specified number of addresses or more are obtained. In this method, a consensus of blockchain is substantially formed by a specified number of participating nodes. Here, when data divided into N data components by means of the Shamir's secret sharing scheme can be reproduced from K data components, the specified number is K. In this case, a consensus on a data acquiring request transaction generated by the data acquirer can be formed when, after the transaction is verified by a miner, K participating nodes confirm the access right of the data acquirer. The decryption processing executed by plural participating nodes is substantially executed in parallel. Accordingly, when the communication method according to the first embodiment is compared with the communication method illustrated in FIG. 3, a time needed from generation of a target transaction to execution of the transaction is reduced.

FIG. 14 is a flowchart of an example of data registration procedures. The processing in this flowchart is executed by the data provider 11.

In S1, the data provider 11 divides data by means of the Shamir's secret sharing scheme and generates plural data components. In S2, the data provider 11 registers the plural data components in IPFS. In S3, the data provider 11 obtains addresses for storage areas in which the plural data components are stored. In S4, the data provider 11 selects plural participating nodes that are to execute decryption processing. In the example illustrated in FIG. 4 to FIG. 13, the participating nodes 1 to 4 are selected. In S5, the data provider 11 encrypts addresses with corresponding public keys of the plural participating nodes selected in S4. In the example illustrated in FIG. 4 to FIG. 13, addresses ADD1 to ADD4 are encrypted with public keys of the participating nodes 1 to 4, respectively.

In S6, the data provider 11 generates an address list that includes the plural encrypted addresses obtained in S5. Note that the address list includes access right information that indicates participating nodes that are allowed to access data D and a list of decrypting nodes that indicates participating nodes that decrypt encrypted addresses, as illustrated in FIG. 6. In S7, the data provider 11 transmits the address list to each of the participating nodes. In other words, the address list is disclosed on the blockchain.

FIG. 15 is a flowchart of an example of processing in a participating node in the data acquiring procedures. Note that each of participating nodes has already received an address list generated in the data registration procedures illustrated in FIG. 14.

In S11, the participating node receives a data acquiring request transaction from a data acquirer. In S12, the participating node refers to access right information on the address list and determines whether a source node of the data acquiring request transaction has the access right or not. Note that the participating node may execute the processing in S12 after a block including the data acquiring request transaction is verified by a miner.

When the source node of the data acquiring request transaction has the access right, the participating node determines whether the participating node itself is designated as a decrypting node on the address list or not in S13. When the participating node itself is designated as a decrypting node, the participating node decrypts an encrypted address on the address list with its own private key in S14. In S15, the participating node transmits an address obtained by the decryption to the source node of the data acquiring request transaction.

Figure 16:
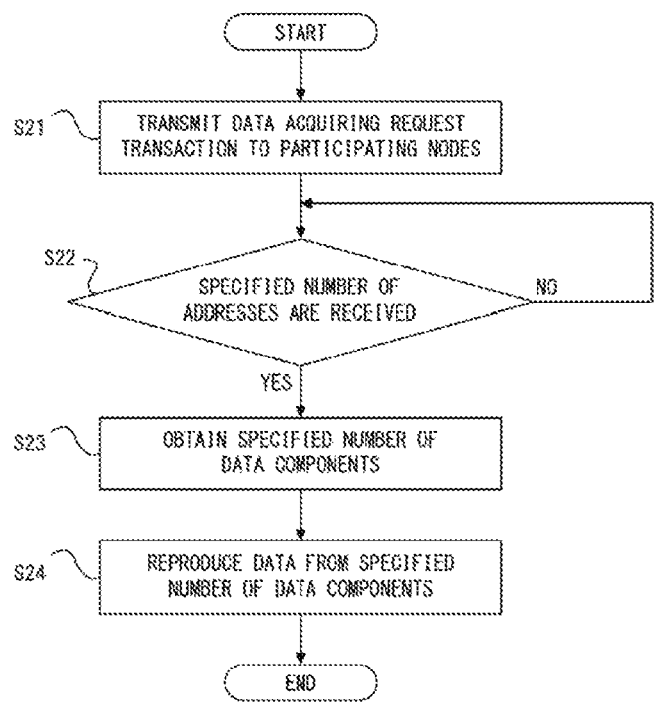
FIG. 16 is a flowchart of an example of processing in a data acquirer.

FIG. 16 is a flowchart of an example of processing in a data acquirer. Note that the data registration procedures illustrated in FIG. 14 has been completed in advance.

In S21, the data acquirer 12 transmits a data acquiring request transaction to each of participating nodes. Afterwards, the data acquirer 12 waits for a response to the data acquiring request transaction. In other words, the data acquirer 12 wait for transmission of addresses for storage areas in which data to be obtained is stored.

In S22, the data acquirer 12 determines whether addresses are received from a specified number of participating nodes. Note that when data divided into N data components by means of the Shamir's secret sharing scheme can be reproduced from K data components, the specified number is K. When addresses are received from the specific number of participating nodes, the data acquirer 12 obtains data components from each of the addresses in S23. In S24, the data acquirer 12 reproduces data from the specified number of data components.

Note that the flowcharts in FIG. 14 to FIG. 16 are merely an example, and the present embodiment is not limited to the above described procedures. For example, the data provider 11 may encrypt data D with a public key of the participating node (data acquirer) 12 before dividing data D. In this case, encrypted data D is divided by means of the Shamir's secret sharing scheme and is registered in IPFS. After reproducing encrypted data D from data components D1 to D4, the data acquirer 12 removes the encryption of data D with a private key of the data acquirer 12. In this manner, the data acquirer 12 can obtains data D.

Alternatively, the data provider 11 may encrypt data D, before dividing data D, with a common key that both the data provider 11 and the data acquirer 11 use. In this case, the data provider 11 encrypts the common key with a public key of the data acquirer 12 and transmits the encrypted common key to the data acquirer 12. The data acquirer 12 receives the encrypted common key and decrypts the common key with a private key of the data acquirer 12. The data acquirer 12, after reproducing encrypted data D from data components D1 to D4, removes the encryption of data D with the decrypted common key. In this manner, the data acquirer 12 can obtain data D.

Figure 17:
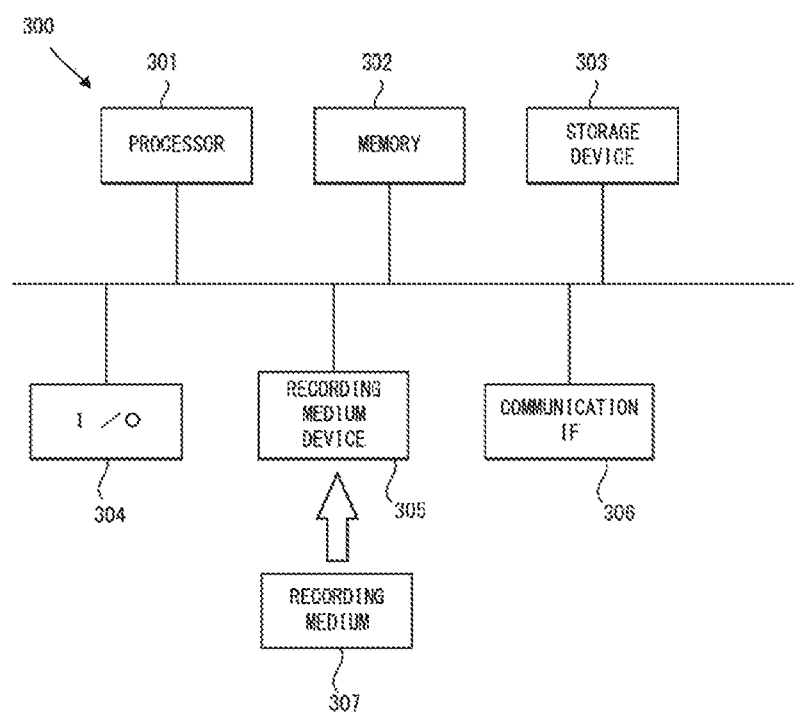
FIG. 17 illustrates an example of a computer hardware configuration installed in each node.

FIG. 17 illustrates an example of a computer hardware configuration installed in each node. This computer 300 includes a processor 301, a memory 302, a storage device 303, an I/O device 304, a recording medium device 305, and a communication interface 306. Note that participating nodes, a data provider, a data acquirer, and miners can each be implemented by the computer illustrated in FIG. 17.

The processor 301 can carry out the data registration procedures and the data acquiring procedures by executing communication programs stored in the storage device 303. Note that when the computer 300 operates as a data provider, the processor 301 executes a communication program in which the process in the flowchart in FIG. 14 is written. When the computer 300 operates as a participating node, the processor 301 executes a communication program in which the process in the flowchart in FIG. 15 is written. When the computer 300 operates as a data acquirer, the processor 301 executes a communication program in which the process in the flowchart in FIG. 16 is written.

The memory 302 is a semiconductor memory as an example and is used as a workspace of the processor 301. The storage device 303 may be installed in the computer 300 or may be connected to the computer 300. The I/O device 304 receives instructions from a user or a network administrator. In addition, the I/O device 304 outputs a processing result of the processor 301. The recording medium device 305 reads signals recorded in a removable recording medium 307. Note that the above-described communication programs may be recorded in the removable recording medium 307. The memory 302, the storage device 303, and the removable recording medium 307 may be an example of a non-transitory computer-readable recording medium. The communication interface 306 provides an interface between the computer 300 and a network.

Second Embodiment

Figure 18:
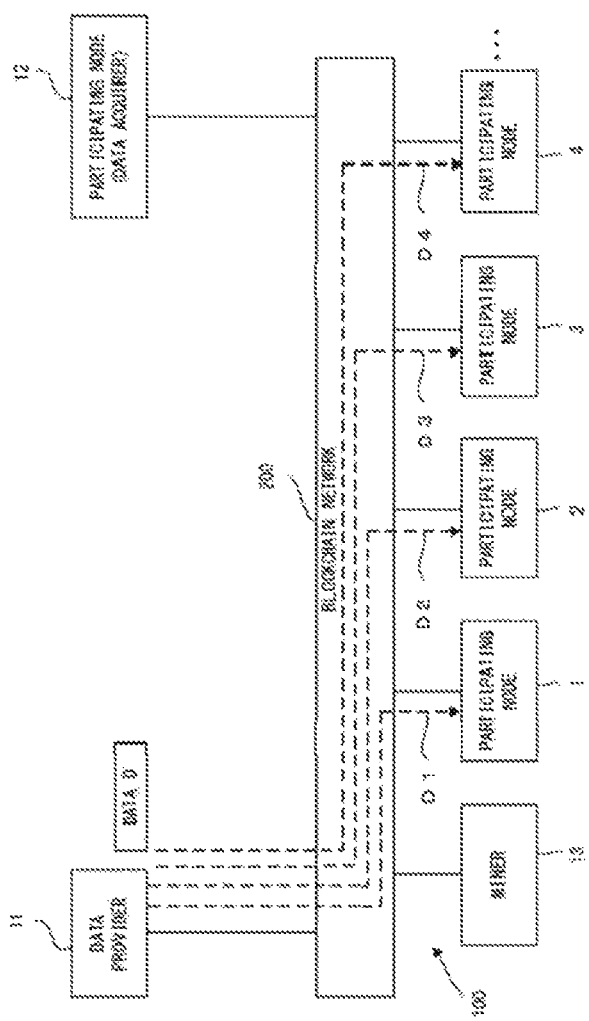
FIG. 18 illustrates an example of data registration procedures according to the second embodiment.

FIG. 18 illustrates an example of data registration procedures according to the second embodiment. Note that a configuration of the communication system 100 is substantially the same between the first embodiment and the second embodiment.

Similarly to the first embodiment, in the second embodiment, the data provider 11 divides data D into data components D1 to D4 by means of the Shamir's secret sharing scheme. However, in the second embodiment, the data provider 11 transmits data components D1 to D4 to the participating nodes 1 to 4, respectively. In other words, the participating node 1 receives data component D1, the participating node 2 receives data component D2, the participating node 3 receives data component D3, and the participating node 4 receives data component D4. The data provider 11 also transmits access right information that indicates the access right to access data D. In this example, the access right information indicates that the participating node (data acquirer) 12 is allowed to access data D.

In the data acquiring procedures, the data acquirer 12 generates a data acquiring request transaction as in the first embodiment. The data acquiring request transaction includes a message that request acquisition of data D. This data acquiring request transaction is transmitted to all participating nodes.

The miner 13 verifies a block including the data acquiring request transaction transmitted from the data acquirer 12 as in the first embodiment. The miner 13 then transmits a verification result of the block to all participating nodes. In other words, each of the participating nodes 1 to 4 receives the verification result from the miner 13.

When the verification result of the block including the data acquiring request transaction is received from the miner 13, each of the participating nodes 1 to 4 confirms the access right of the data acquiring request transaction transmitted from the data acquirer 12 as in the first embodiment. At that time, each of the participating nodes 1 to 4 refers to the access right information received in advance from the data provider 11. In this example, the participating node (data acquirer) 12 is granted access to data D. Each of the participating nodes 1 to 4 then executes a process to respond to the received data acquiring request transaction.

More specifically, each of the participating nodes 1 to 4 transmits the data component received in advance from the data provider 11 to the data acquirer 12. In other words, data components D1 to 4 are transmitted from the participating nodes 1 to 4, respectively, to the data acquirer 12. The data acquirer 12 then reproduces data D from data components D1 to D4 received from the participating nodes 1 to 4, respectively.

Third Embodiment

FIG. 19 illustrates an example of data registration procedures according to the third embodiment. Note that a configuration of the communication system 100 is substantially the same between the first embodiment and the third embodiment.

Similarly to the first embodiment, in the third embodiment, the data provider 11 divides data D into data components D1 to D4 by means of the Shamir's secret sharing scheme. However, in the third embodiment, the data provider 11 encrypts data components D1 to D4 with public keys of the participating nodes 1 to 4, respectively. In other words, data component D1 is encrypted with a public key of the participating node 1, data component D2 is encrypted with a public key of the participating node 2, data component D3 is encrypted with a public key of the participating node 3, and data component D4 is encrypted with a public key of the participating node 4. The data provider 11 then generates a data component list that includes encrypted data components D1 to D4.

Figure 20:
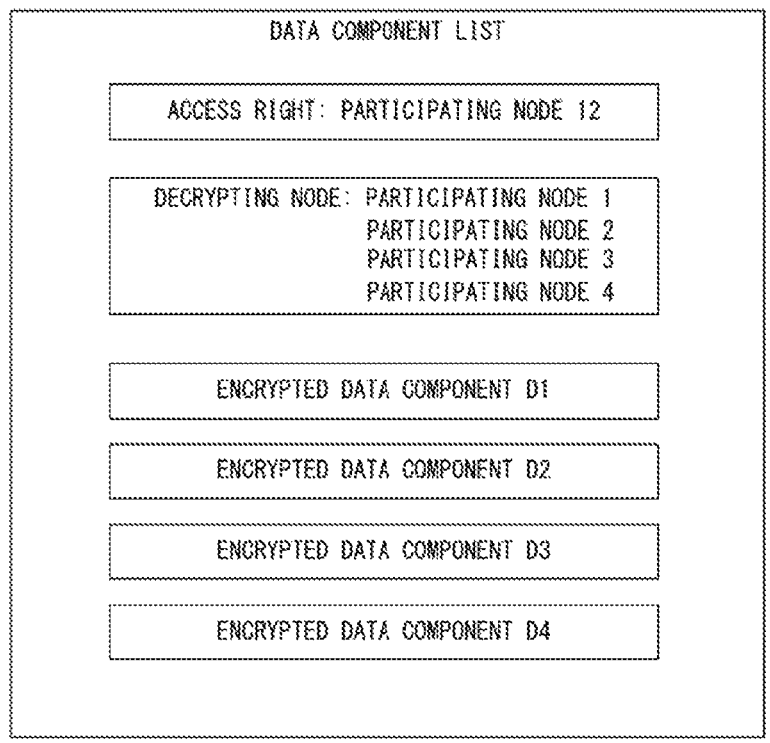
FIG. 20 illustrates an example of a data component list.

The data component list includes access right information, a list of decrypting nodes, and encrypted data components, as illustrated in FIG. 20. Note that since the access right information and the list of decrypting nodes are substantially the same between the first embodiment and the third embodiment, the explanation is omitted.

The data provider 11 discloses the data component list on the blockchain. In other words, the data provider 11 transmits the data component list to all participating nodes. Accordingly, each of the participating nodes 1 to 4 receives the data component list.

In the data acquiring procedures, the data acquirer 12 generates a data acquiring request transaction as in the first embodiment. This data acquiring request transaction includes a message that requests acquisition of data D. The data acquiring request transaction is transmitted to all participating nodes.

The miner 13 verifies a block including the data acquiring request transaction transmitted from the data acquirer 12 as in the first embodiment. The miner 13 then transmits a verification result of the block to all participating nodes. In other words, each of the participating nodes 1 to 4 receives the verification result from the miner 13.

When the verification result of the block including the data acquiring request transaction is received from the miner 13, each of the participating nodes 1 to 4 confirms the access right of the data acquiring request transaction transmitted from the data acquirer 12 as in the first embodiment. At that time, each of the participating nodes 1 to 4 refers to the access right information in the data component list received in advance from the data provider 11. In this example, the participating node (data acquirer) 12 is granted access to data D. Each of the participating nodes 1 to 4 then executes a process to respond to the received data acquiring request transaction.

The participating node 1 executes decryption process on four encrypted data components D1 to D4 by using a private key of the participating node 1. Here, the encrypted data components D1 to D4 are encrypted with public keys of the participating nodes 1 to 4, respectively. Thus, when the decryption process is executed with a private key of the participating node 1, decryption of encrypted data component D1 will be successful, but decryption of encrypted data components D2 to D4 will fail. In other words, the participating node 1 can obtain data component D1, but cannot obtain data components D2 to D4.

In the similar manner, the participating node 2 executes decryption process on encrypted data components D1 to D4 by using a private key of the participating node 2 and obtains data component D2. The participating node 3 executes decryption process on encrypted data components D1 to D4 by using a private key of the participating node 3 and obtains data component D3. The participating node 4 executes decryption process on encrypted data components D1 to D4 by using a private key of the participating node 4 and obtains data component D4. Subsequently, the participating nodes 1 to 4 respectively transmit data components D1 to D4 to data acquirer 12. The data acquirer 12 then reproduces data D from data components D1 to D4 received from the participating nodes 1 to 4, respectively.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a program for causing a processor to execute a communication process, the processor being implemented in a data providing node of a block chain network that provides requested data to a data acquiring node of the block chain network based on a consensus of a plurality of participating nodes of the block chain network, the communication process comprising: dividing the requested data into N data components, N being an integer equal to or larger than two; encrypting, when the N data components are stored in different storage areas of N participating nodes of the block chain network, addresses of storage areas of the N participating nodes of the block chain network in which the N data components are respectively stored by using respective public keys of the N participating nodes among the plurality of participating nodes of the block chain network to encrypt addresses of storage areas of the N participating nodes of the block chain network in which the N data components are respectively stored when the N data components are stored in different storage areas of the N participating nodes of the block chain network; and transmitting access right information, using the block chain network, to the plurality of participating nodes of the block chain network, wherein the access right information indicates the data acquiring node has a right to access the requested data and the encrypted N addresses, and the respective public keys of the N participating nodes are different from each other.

2. The non-transitory computer-readable recording medium according to claim 1, wherein
the data is divided into N data components by using a Shamir's secret sharing scheme so that the data can be reproduced from K data components among the N data components, K being an integer equal to or smaller than N.

3. A communication device within a block chain network that provides requested data to a data acquiring node of the block chain network based on a consensus of a plurality of participating nodes of the block chain network, the communication device comprising a processor configured to: divide the requested data into N data components, N being an integer equal to or larger than two; encrypt, when the N data components are stored in different storage areas of N participating nodes of the block chain network, addresses of storage areas of the N participating nodes of the block chain network in which the N data components are respectively stored by using respective public keys of the N participating nodes among the plurality of participating nodes of the block chain network to encrypt addresses of storage areas of the N participating nodes of the block chain network in which the N data components are respectively stored when the N data components are stored in different storage areas of the N participating nodes of the block chain network; and transmit access right information, using the block chain network, to the plurality of participating nodes of the block chain network, wherein the access right information indicates the data acquiring node has a right to access the requested data and the encrypted N addresses, and the respective public keys of the N participating nodes are different from each other.

4. A communication method that provides requested data to a data acquiring node of a block chain network based on a consensus of a plurality of participating nodes of the block chain network, the communication method comprising: dividing the requested data into N data components, N being an integer equal to or larger than two; encrypting, when the N data components are stored in different storage areas of N participating nodes of the block chain network, addresses of storage areas of the N participating nodes of the block chain network in which the N data components are respectively stored by using respective public keys of the N participating nodes among the plurality of participating nodes of the block chain network to encrypt addresses of storage areas of the N participating nodes of the block chain network in which the N data components are respectively stored when the N data components are stored in different storage areas of the N participating nodes of the block chain network; and transmitting access right information, using the block chain network, to the plurality of participating nodes of the block chain network, wherein the access right information indicates the data acquiring node has a right to access the requested data and the encrypted N addresses, and the respective public keys of the N participating nodes are different from each other.

5. The communication method according to claim 4, wherein
when each of the participating nodes receives from the data acquiring node a data acquiring request that requests acquisition of the data,
each of the plurality of participating nodes:
confirms that the data acquiring node has a right to access the data by using the access right information;
decrypts the encrypted N addresses with an own private key; and
transmits an address obtained by the decryption to the data acquiring node.

6. The communication method according to claim 5, wherein
the data acquiring node uses addresses received from two or more of the plurality of participating nodes to acquire corresponding data components from the storage areas.

7. The communication method according to claim 6, wherein
when the data is divided into N data components by using a Shamir's secret sharing scheme so that the data can be reproduced from K data components among the N data components, the data acquiring node reproduces the data by obtaining K or more data components from the storage regions by using addresses received from K or more of the plurality of participating nodes.

8. The communication method according to claim 4, wherein
the data is encrypted with a public key of the data acquiring node before the data is divided into N data components.

9. The communication method according to claim 4, wherein
the data is encrypted with a common key before the data is divided into N data components, and
the common key is encrypted with a public key of the data acquiring node and is transmitted to the data acquiring node.

* * * * *